United States Patent
Ema et al.

(10) Patent No.: US 12,366,852 B2
(45) Date of Patent: Jul. 22, 2025

(54) ANALYSIS APPARATUS, ANALYSIS METHOD AND COMPUTER-READABLE MEDIUM

(71) Applicant: Yokogawa Electric Corporation, Tokyo (JP)

(72) Inventors: Nobuaki Ema, Tokyo (JP); Takahiro Kambe, Tokyo (JP); Tatenobu Seki, Tokyo (JP); Masato Annen, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 456 days.

(21) Appl. No.: 17/673,753

(22) Filed: Feb. 16, 2022

(65) Prior Publication Data
US 2022/0291673 A1 Sep. 15, 2022

(30) Foreign Application Priority Data
Mar. 10, 2021 (JP) ................. 2021-038048

(51) Int. Cl.
G05B 13/04 (2006.01)
G05B 17/02 (2006.01)
G05B 23/02 (2006.01)

(52) U.S. Cl.
CPC ....... G05B 23/0232 (2013.01); G05B 13/041 (2013.01); G05B 17/02 (2013.01)

(58) Field of Classification Search
CPC ............ G05B 23/0232; G05B 23/0254; G05B 23/0283; G05B 23/024; G05B 23/0229; G05B 13/04; G05B 13/041; G05B 17/02; G05B 2219/23005; G05B 2219/23292;
(Continued)

(56) References Cited

U.S. PATENT DOCUMENTS

| | | | | |
|---|---|---|---|---|
| 6,950,741 B2 * | 9/2005 | Ishikawa | ................. | G05B 21/02 60/284 |
| 2002/0084900 A1 * | 7/2002 | Peterson | ................... | G08B 7/06 340/573.1 |

(Continued)

FOREIGN PATENT DOCUMENTS

| | | | | | |
|---|---|---|---|---|---|
| CN | 108700852 A | * | 10/2018 | ............. | G05B 13/04 |
| JP | H05313557 A | * | 5/1992 | ............. | G05B 23/02 |

(Continued)

OTHER PUBLICATIONS

Office Action issued for counterpart Japanese Application No. 2021-038048, issued by the Japanese Patent Office on Apr. 18, 2023 (drafted on Apr. 12, 2023).

(Continued)

*Primary Examiner* — Jeffrey P Aiello

(57) ABSTRACT

Provided is an analysis apparatus comprising: a variation model storage unit configured to store a plurality of variation models indicating variation in characteristics of a plant corresponding to an operating condition of the plant; a model extraction unit configured to acquire structure information indicating a structure model of an analysis target plant and to extract the variation model corresponding to the structure model; and an analysis unit configured to analyze the analysis target plant, based on the structure model of the analysis target plant and the variation model extracted by the model extraction unit.

20 Claims, 13 Drawing Sheets

(58) Field of Classification Search
CPC .......... G05B 2219/23456; G05B 2219/34477;
G06Q 10/06; G06N 20/00; G06N 5/00
USPC ............. 700/286, 28, 30, 292, 50, 276, 108;
702/183, 182, 179, 85, 181, 188, 116,
702/185, 79, 81, 84, 1, 104, 189; 703/2,
703/13, 6
See application file for complete search history.

(56) References Cited

U.S. PATENT DOCUMENTS

| | | | | |
|---|---|---|---|---|
| 2006/0047349 | A1* | 3/2006 | Yasui | G05B 17/02 700/20 |
| 2014/0309756 | A1* | 10/2014 | Trygstad | G05B 13/048 700/31 |
| 2020/0265361 | A1 | 8/2020 | Suzuki | |
| 2020/0326693 | A1* | 10/2020 | Kimura | G06F 30/20 |

FOREIGN PATENT DOCUMENTS

| | | | | |
|---|---|---|---|---|
| JP | H06289179 | A | 10/1994 | |
| JP | 2001306106 | A | 11/2001 | |
| JP | 2009163507 | A | 7/2009 | |
| JP | 2013109711 | A * | 6/2013 | ............. G05B 13/04 |
| JP | 2018169759 | A | 11/2018 | |
| JP | 2019121112 | A | 7/2019 | |
| JP | 2020035107 | A * | 3/2020 | ............. Y02E 30/30 |
| JP | 2019159883 | A1 | 7/2020 | |
| JP | 2021022290 | A | 2/2021 | |
| WO | WO-2021028545 | A1 * | 2/2021 | ............. G05B 17/02 |

OTHER PUBLICATIONS

Extended European Search Report for counterpart European Application No. 22159186.0, issued by the European Patent Office on Aug. 8, 2022.

* cited by examiner

| VARIATION MODEL | DEVICE NAME | DEVICE TYPE | ORIGINAL PLANT | ONTOLOGY | OPERATING CONDITION |
|---|---|---|---|---|---|
| VARIATION MODEL A | DEVICE A | TYPE A | PLANT A | EXPRESSION A | CONDITION A |
| VARIATION MODEL B | DEVICE B | TYPE B | PLANT B | EXPRESSION B | CONDITION B |
| VARIATION MODEL C | DEVICE C | TYPE C | PLANT C | EXPRESSION C | CONDITION C |
| VARIATION MODEL D | DEVICE D | TYPE D | PLANT D | EXPRESSION D | CONDITION D |
| VARIATION MODEL E | DEVICE E | TYPE D | PLANT E | EXPRESSION D | CONDITION E |
| VARIATION MODEL F | DEVICE F | TYPE E | PLANT E | EXPRESSION E | CONDITION E |
| VARIATION MODEL G | DEVICE G | TYPE F | PLANT F | EXPRESSION F | CONDITION F |
| VARIATION MODEL H | DEVICE H | TYPE G | PLANT G | EXPRESSION G | CONDITION G |
| VARIATION MODEL I | DEVICE I | TYPE H | PLANT G | EXPRESSION H | CONDITION H |
| ⋮ | ⋮ | ⋮ | ⋮ | ⋮ | ⋮ |

| STRUCTURE MODEL | DEVICE NAME | DEVICE TYPE | ORIGINAL PLANT | ONTOLOGY |
|---|---|---|---|---|
| STRUCTURE MODEL A | DEVICE A | TYPE A | PLANT A | EXPRESSION A |
| STRUCTURE MODEL B | DEVICE B | TYPE B | PLANT B | EXPRESSION B |
| STRUCTURE MODEL C | DEVICE C | TYPE C | PLANT C | EXPRESSION C |
| STRUCTURE MODEL D | DEVICE D | TYPE D | PLANT D | EXPRESSION D |
| STRUCTURE MODEL E | DEVICE E | TYPE D | PLANT E | EXPRESSION D |
| STRUCTURE MODEL F | DEVICE F | TYPE E | PLANT E | EXPRESSION E |
| STRUCTURE MODEL G | DEVICE G | TYPE F | PLANT F | EXPRESSION F |
| STRUCTURE MODEL H | DEVICE H | TYPE G | PLANT G | EXPRESSION G |
| STRUCTURE MODEL I | DEVICE I | TYPE H | PLANT G | EXPRESSION H |
| ⋮ | ⋮ | ⋮ | ⋮ | ⋮ |

| VARIATION MODEL | STRUCTURE | FUNCTION TYPE | ORIGINAL PLANT | ONTOLOGY | OPERATING CONDITION |
|---|---|---|---|---|---|
| VARIATION MODEL A | DEVICE A, B, ·· | TYPE A | PLANT A | EXPRESSION A | CONDITION A |
| VARIATION MODEL B | DEVICE A, B, ·· | TYPE A | PLANT A | EXPRESSION A | CONDITION B |
| VARIATION MODEL C | DEVICE A, B, ·· | TYPE A | PLANT A | EXPRESSION A | CONDITION C |
| VARIATION MODEL D | DEVICE G, H, ·· | TYPE D | PLANT D | EXPRESSION D | CONDITION D |
| VARIATION MODEL E | DEVICE I, J, ·· | TYPE D | PLANT E | EXPRESSION D | CONDITION E |
| VARIATION MODEL F | DEVICE K, L, ·· | TYPE E | PLANT E | EXPRESSION E | CONDITION E |
| VARIATION MODEL G | DEVICE M, N, ·· | TYPE F | PLANT F | EXPRESSION F | CONDITION F |
| VARIATION MODEL H | DEVICE O, P, ·· | TYPE G | PLANT G | EXPRESSION G | CONDITION G |
| VARIATION MODEL I | DEVICE Q, R, ·· | TYPE H | PLANT G | EXPRESSION H | CONDITION H |
| ⋮ | ⋮ | ⋮ | ⋮ | ⋮ | ⋮ |

| STRUCTURE MODEL | STRUCTURE | FUNCTION TYPE | ORIGINAL PLANT | ONTOLOGY |
|---|---|---|---|---|
| STRUCTURE MODEL A | DEVICE A, B, ·· | TYPE A | PLANT A | EXPRESSION A |
| STRUCTURE MODEL B | DEVICE C, D, ·· | TYPE B | PLANT B | EXPRESSION B |
| STRUCTURE MODEL C | DEVICE E, F, ·· | TYPE C | PLANT C | EXPRESSION C |
| STRUCTURE MODEL D | DEVICE G, H, ·· | TYPE D | PLANT D | EXPRESSION D |
| STRUCTURE MODEL E | DEVICE I, J, ·· | TYPE D | PLANT E | EXPRESSION D |
| STRUCTURE MODEL F | DEVICE K, L, ·· | TYPE E | PLANT E | EXPRESSION E |
| STRUCTURE MODEL G | DEVICE M, N, ·· | TYPE F | PLANT F | EXPRESSION F |
| STRUCTURE MODEL H | DEVICE O, P, ·· | TYPE G | PLANT G | EXPRESSION G |
| STRUCTURE MODEL I | DEVICE Q, R, ·· | TYPE H | PLANT G | EXPRESSION H |
| ⋮ | ⋮ | ⋮ | ⋮ | ⋮ |

ANALYSIS APPARATUS, ANALYSIS METHOD AND COMPUTER-READABLE MEDIUM

The contents of the following Japanese patent application(s) are incorporated herein by reference:
No. 2021-038048 filed in JP on Mar. 10, 2021.

BACKGROUND

1. Technical Field

The present invention relates to an analysis apparatus, an analysis method, and a computer-readable medium having a program recorded thereon.

2. Related Art

In the related art, known is software such as a simulator configured to analyze a behavior of a plant (for example, refer to Patent Document 1).

Patent Document 1: Japanese Patent Application Publication No. 2019-121112
Patent Document 2: Japanese Patent Application Publication No. 2009-163507
Patent Document 3: Japanese Patent Application Publication No. 2013-109711

SUMMARY

A first aspect of the present invention provides an analysis apparatus. The analysis apparatus may comprise a variation model storage unit configured to store a plurality of variation models indicating variation in characteristics of a plant corresponding to an operating condition of the plant. The analysis apparatus may comprise a model extraction unit configured to acquire structure information indicating a structure model of an analysis target plant and to extract the variation model corresponding to the structure model. The analysis apparatus may comprise an analysis unit configured to analyze the analysis target plant, based on the structure model of the analysis target plant and the variation model extracted by the model extraction unit.

A second aspect of the present invention provides an analysis method. In the analysis method, a plurality of variation models indicating variation in characteristics of a plant corresponding to an operating condition of the plant may be stored. In the analysis method, structure information indicating a structure model of an analysis target plant may be acquired and the variation model corresponding to the structure model may be extracted. In the analysis method, the analysis target plant may be analyzed, based on the structure model of the analysis target plant and the variation model.

A third aspect of the present invention provides a program for causing a computer to execute the analysis method according to the second aspect.

The summary clause does not necessarily describe all necessary features of the embodiments of the present invention. The present invention may also be a sub-combination of the features described above.

BRIEF DESCRIPTION OF THE DRAWINGS

FIG. 4 is an example of information that is stored in a variation model storage unit 20.

FIG. 5 is an example of information that is stored in a structure model storage unit 30.

FIG. 8 is another example of the information that is stored in the variation model storage unit 20.

FIG. 9 is another example of the information that is stored in the structure model storage unit 30.

DESCRIPTION OF EXEMPLARY EMBODIMENTS

Hereinafter, the present invention will be described through embodiments of the invention, but the following embodiments do not limit the invention according to the claims. In addition, not all combinations of features described in the embodiments are essential to the solution of the invention.

Figure 1:
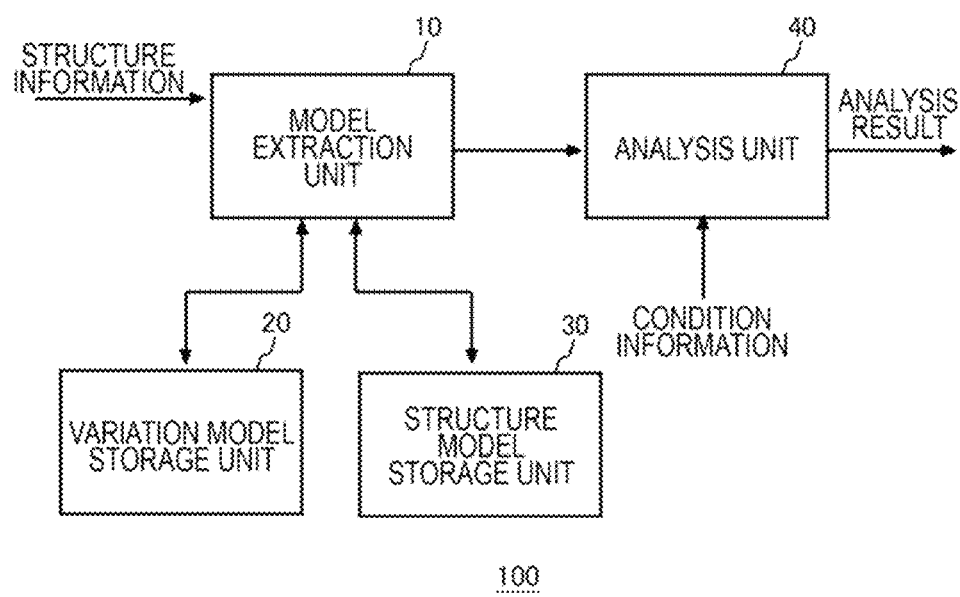
FIG. 1 shows a configuration example of an analysis apparatus 100 configured to analyze an operation of a plant.

FIG. 1 shows a configuration example of an analysis apparatus 100 configured to analyze an operation of a plant. The analysis apparatus 100 may be configured to analyze an operation of an existing plant, or may also be configured to analyze an operation of a plant to be constructed in the future. The plant is, for example, at least a part of a facility such as a water treatment facility, a production facility, a power generation facility and a storage facility.

The analysis apparatus 100 of the present example is a computer configured to perform predetermined data processing. The computer may be configured to execute a program for causing the computer to function as each unit of the analysis apparatus 100. The analysis apparatus 100 of the present example is configured to acquire structure information indicating a structure of an analysis target plant. The structure information may be a piping and instrumentation diagram (P&ID) of a plant or CAD data indicating arrangement of equipment such as a device and a piping. In the present specification, the equipment such as a device and a piping is simply referred to as 'device' when they are not particularly explicitly distinguished from each other. The analysis apparatus 100 is configured to analyze an operation of a plant, based on a structure model and a variation model corresponding to the structure information. Each model may be a data group or a program for simulating an operation of each device of the plant. The data group or program may include an arithmetic expression such as an equation or a determinant.

The structure model of a plant is a model determined from a structure of the plant, and is a model that does not consider variation in characteristics of each device. In the structure model, when a device is not changed in the plant, a characteristic of each device is treated as not changing from a predetermined characteristic value such as a characteristic at the time of construction of the plant, for example. When a device is changed, the structure model is changed according to the device change. The structure model may be generated from a piping and instrumentation diagram (P&ID) of a plant or CAD data indicating arrangement of equipment such as a device and a piping. The structure model may also include the piping and instrumentation map (P&ID) of the plant or the CAD data itself.

In addition, the structure model may be a part, which is not affected by the variation in characteristics of each device, of a model configured to simulate an operation of the plant. For example, the structure model may include a procedure control model showing a procedure by which each device is operated. The procedure control model may include information, which indicates control information on each device in chronological order, and may include information, which indicates a state such as an internal temperature and an internal pressure to be indicated by each device in chronological order. For example, the control information may include a control value for setting a ratio of a specific device to operate with respect to a maximum specification. The structure model may also include time-series data of the control value. The structure model may also include a model shown by a process flow diagram (PFD). Among information included in the process flow diagram, a part that is affected by the variation in characteristics of the device may also be used as a variation model.

The variation model of a plant is a model simulating the variation in characteristics of each device of the plant. The variation model may be a model estimated from a structure of each device, or may also be a model generated from past actual operation data. The variation model may be a model generated from variation over time in characteristics of a device of an existing plant. The variation model may be configured to simulate variation in characteristics of each device, according to a load on each device of the plant. The load on a device includes each index that can give reversible or irreversible deterioration to a characteristic of the device, such as control information for controlling the device, an ambient temperature of the device, an internal temperature of the device, a flow rate of a fluid passing through the device, an operating time and an operating rate (i.e., a ratio of an operating time to a downtime). The reversible deterioration is deterioration that can be recovered by a cleaning process or the like, such as dirt or deposit of foreign matters, for example. The variation model may be a model indicating variation in actual characteristics of a device with respect to an expected characteristic of the device when the device is controlled based on predetermined control information. The variation model may be a model simulating an influence of deterioration, dirt, a deposited material and the like on equipment such as a device or a piping.

Note that, in the present specification, a structure model of the entire plant may be referred to as an entire structure model, and a structure model of a part of the plant may be referred to as a partial structure model. Similarly, a variation model of the entire plant may be referred to as an entire variation model, and a variation model of a part of the plant may be referred to as a partial variation model.

The analysis apparatus 100 may be configured to construct an entire structure model and an entire variation model by combining a partial structure model and a partial variation model corresponding to a device included in the analysis target plant. The analysis apparatus 100 is configured to analyze an operation of the entire or partial plant at a certain time in the future, based on the entire or partial structure model and variation model. The analysis apparatus 100 may be configured to analyze a connection relationship, an initial value of a characteristic and the like of each device, based on the structure model, and to analyze a future characteristic value of each device, based on the variation model, thereby analyzing an operation of the plant. The analysis apparatus 100 of the present example comprises a model extraction unit 10, an analysis unit 40, and a variation model storage unit 20. The analysis apparatus 100 may further comprise a structure model storage unit 30.

The variation model storage unit 20 is configured to store a plurality of variation models indicating variation in characteristics of a plant corresponding to an operating condition of the plant. The variation model storage unit 20 may be configured to store the entire variation model or may also be configured to store the partial variation model.

The operating condition of a plant is a condition that affects a characteristic of a device included in the plant. As described above, the operating condition of a plant may be a condition indicating the load on each device. As an example, the operating condition of a plant is a condition that affects deterioration over time of a characteristic of each device. The operating condition of a plant may also be a condition extracted from a future operating plan of the plant. For example, the operating condition of a plant includes an operating time of the plant at a certain time point in the future, an operating rate of the plant (i.e., a ratio of an operating time to a downtime), a cumulative production volume of products of the plant, a cumulative input amount of materials to be input to the plant, and a cumulative consumption of resources such as electric power or water consumed by the plant. By these indexes, a degree of deterioration of each device of a plant may change. In addition, by these indexes, a degree of dirt or a deposit degree of foreign matters of each device of a plant may change. The variation model storage unit 20 may be configured to store a variation model corresponding to a degree of deterioration of each device and a variation model corresponding to dirt or a deposited material in each device, as different types of models. The analysis unit 40 may be configured to generate a model in which a plurality of types of variation models is combined, for one device.

In addition, the operating condition may include future control information of each device. The control information may include control data that is input to each device so as to control an operation of a device. For example, the control data is data for controlling an opening degree of a valve, and the like. From the control information, it is possible to analyze the load on a device in the future and to estimate variation in characteristics of a device.

The operating condition may include a condition indicating an ambient environment of a plant or a device. The ambient environment may be, for example, weather data such as a temperature, a humidity and an amount of rainfall. Even when each device is controlled in a similar manner, the degree of deterioration of each device may change, depending on the ambient environment such as a cold region and a warm region.

The operating condition may also include an index related to an operator who operates each device of the plant. The operating condition may include an index indicating a level of skill of the operator. Even when an operation plan such as a production volume of a plant is similar, the load on each device may change and the degree of deterioration of each device may change, depending on a level of skill of the operator. The level of skill of the operator may be a time required from a start to an end of a predetermined operation by the operator.

The operating condition may also include indexes related to a maintenance cycle of each device of a plant and a maintenance content. By the maintenance cycle or maintenance content of each device, the degree of deterioration of each device may change even when an operating time of each device is similar.

The variation model storage unit 20 may be configured to store a variation model generated from an actual operation result of an existing plant. The variation model may be generated from a relationship between an actual performance value of each operating condition described above in the existing plant and a degree of deterioration of each device of the existing plant. The degree of deterioration of each device may be a deviation between an actual performance value and a target value when, for example, the device is controlled to control an index such as a flow rate to the target value.

The model extraction unit 10 is configured to acquire structure information indicating a structure of an analysis target plant. The structure information may include information indicating a structure model. The model extraction unit 10 is configured to extract a variation model corresponding to the structure information from the variation model storage unit 20. Thereby, the model extraction unit 10 is configured to extract the variation model corresponding to the structure model. The model extraction unit 10 of the present example is configured to extract a corresponding partial variation model for each device or block included in the analysis target plant, based on the structure information. The structure information may include the structure model itself, and may also include information for specifying any one or more structure models stored in the structure model storage unit 30.

The structure model storage unit 30 is configured to store a plurality of structure models. The structure model storage unit 30 may be configured to store the entire structure model or may also be configured to store the partial structure model. The structure model storage unit 30 may be configured to store a structure model used when analyzing an existing plant, in a form of a database.

The model extraction unit 10 of the present example is configured to extract a partial variation model corresponding to a device or block included in the structure model from the variation model storage unit 20. The model extraction unit 10 is configured to generate an entire variation model by combining partial variation models corresponding to respective devices or blocks, based on the entire structure model.

The analysis unit 40 is configured to analyze the analysis target plant, based on the structure model of the analysis target plant and the variation model extracted by the model extraction unit 10. Condition information indicating the operating condition of the analysis target plant is input to the analysis unit 40. The analysis unit 40 may be configured to output an analysis result indicating an operation of the analysis target plant in the future. For example, the analysis unit 40 is configured to analyze parameters such as a production volume of the analysis target plant, consumption amounts of a raw material and a resource, a temperature at each node, and a flow rate. The analysis unit 40 may also be configured to output a module for simulation configured to simulate an operation of the analysis target plant by combining the structure model and the variation model. When the condition information of the analysis target plant is input, the module may be configured to output an operation result corresponding to the condition information. According to the present example, it is possible to accurately analyze the operation of the analysis target plant, in consideration of the variation model.

Figure 2:
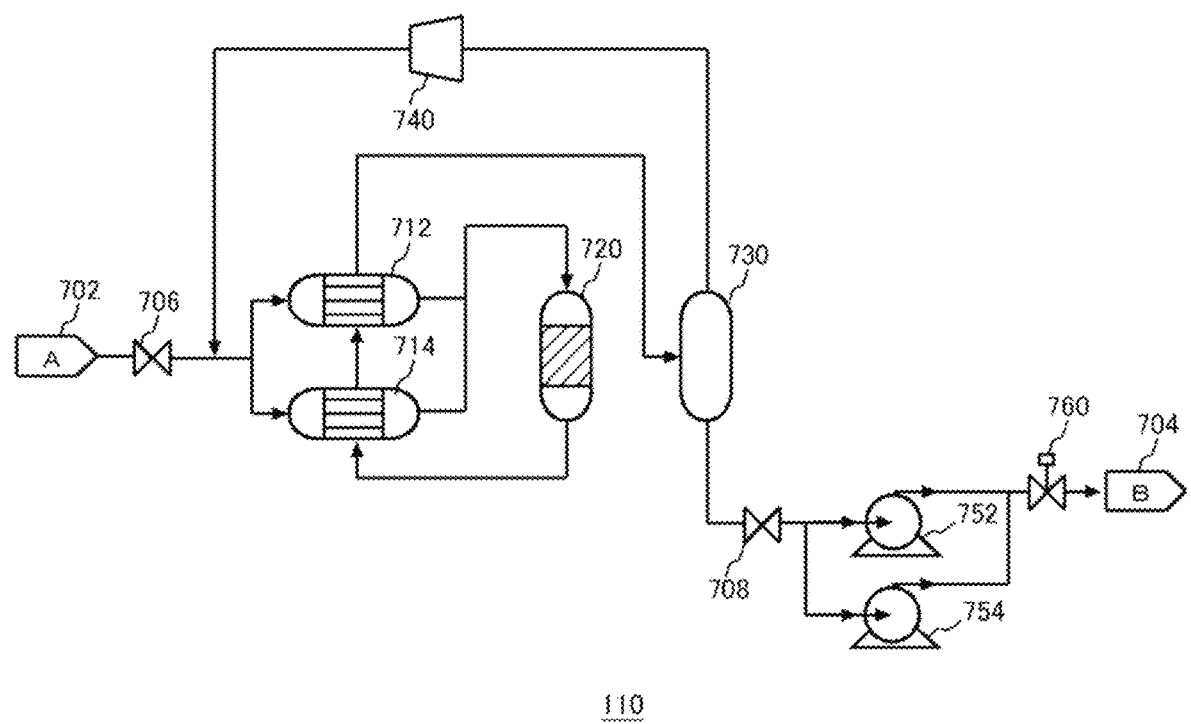
FIG. 2 shows a configuration example of an analysis target plant 110.

FIG. 2 shows a configuration example of an analysis target plant 110. In the example of FIG. 2, the analysis target plant includes an input unit 702, an output unit 704, a valve 706, a first heat exchanger 712, a second heat exchanger 714, a reactor 720, a tank 730, a compressor 740, a valve 708, a first pump 752, a second pump 754, a valve 760, and a piping connecting these devices. The structure model storage unit 30 may be configured to store a partial structure model corresponding to these devices and the piping. The entire structure model 110 includes information of arrangement and connection relationship of equipment such as a device and a piping, such as a piping and instrumentation diagram (P&ID) of a plant. In addition, the structure shown in FIG. 2 may be a part of the analysis target plant. The input unit 702 and the output unit 704 indicate connection parts between the part and upstream and downstream parts.

The structure model may include characteristic information indicating characteristics of these devices and piping. As described above, the characteristic information included in the structure model may be a value that does not change over time. As an example, the characteristic information included in the structure model is initial values of the characteristics of each device and piping.

Figure 3:
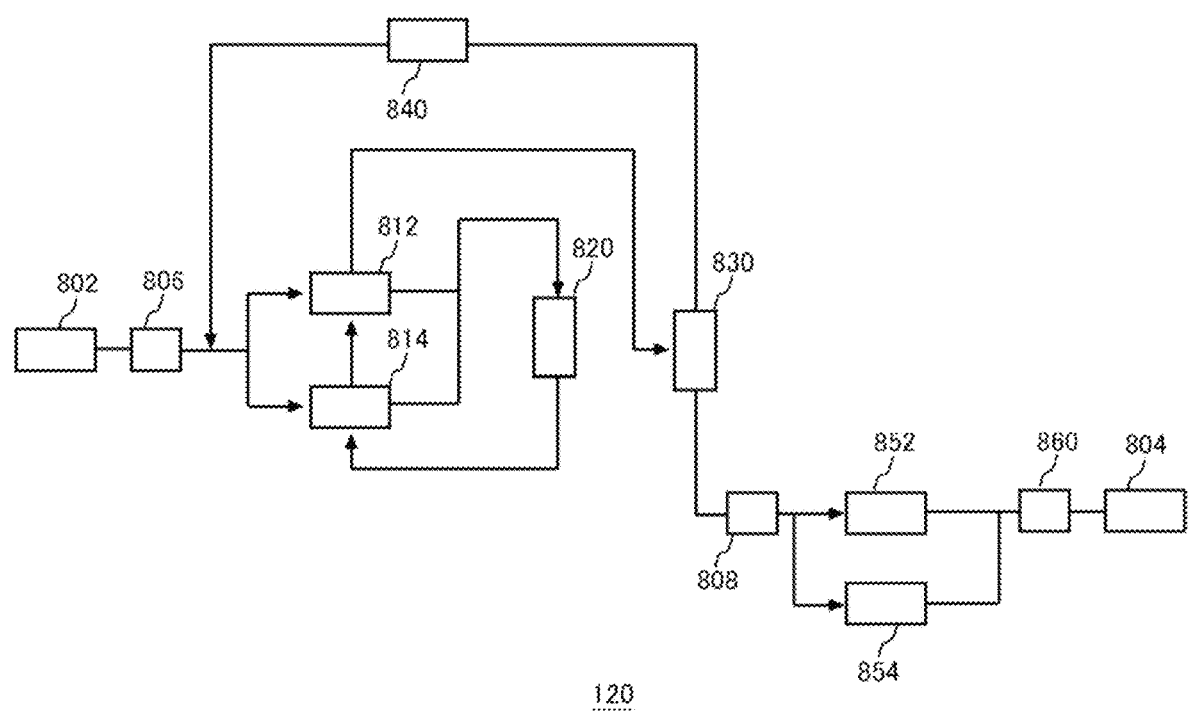
FIG. 3 shows an example of information that is included in an entire variation model 120.

FIG. 3 shows an example of information that is included in an entire variation model 120. The model extraction unit 10 of the present example is configured to extract a corresponding variation model from the variation model storage unit 20 for each device and piping included in the analysis target plant 110. The model extraction unit 10 may be configured to acquire, from the structure information, attribute information such as names, types, functions, performances and ontology of devices and piping included in the analysis target plant 110. The model extraction unit 10 is configured to extract a variation model from the variation model storage unit 20, based on the attribute information. The variation model storage unit 20 is preferably configured to store the attribute information of respective variation models.

In the example of FIG. 3, partial variation models 802, 804, 806, 812, 814, 820, 830, 840, 808, 852, 854 and 860 are extracted as variation models corresponding to the input unit 702, the output unit 704, the valve 706, the first heat exchanger 712, the second heat exchanger 714, the reactor 720, the tank 730, the compressor 740, the valve 708, the first pump 752, the second pump 754 and the valve 760. As for a variation model for piping, a reference sign thereof is omitted in FIG. 3. The model extraction unit 10 is configured to construct an entire variation model 120 by combining respective partial variation models extracted for each device and piping.

Note that, ontology is sometimes described as a formal expression that regards knowledge as a set of concepts and relationships between concepts. For example, by defining a word as a plurality of concepts and relationships between concepts, it is possible to distinguish that the word can be identified from other words, can be discriminated from homonyms, is a synonym of words with different notations and the like, and it is possible to effectively treat the word as knowledge. As an example, a word 'pipe' can be understood to mean a tube for causing a liquid, a gas and the like to pass through by being associated with concepts such as 'cylinder', 'tubular', 'gas' and the like, and can be distinguished from a 'pipe' indicating a tool for smoking cigarettes, a wind instrument and a function of giving and taking a data value and the like in a program. The variation model storage unit 20 may be configured to store words expressing devices and the like corresponding to the respective partial variation models with ontology.

For example, in a case where a word such as 'flow rate' is associated with a certain partial variation model and a word such as 'pump' is associated with a certain device, the model extraction unit 10 can distinguish that the partial variation model corresponds to the device, from a relationship between these words. In this way, by using the ontology, it is possible to extract a partial variation model corresponding to each device even when the attribute information is not matched.

FIG. 4 is an example of information that is stored in the variation model storage unit 20. The variation model storage unit 20 stores a plurality of partial variation models (variation models A, B, . . . ). In addition, the variation model storage unit 20 stores one or more attribute information for each partial variation model. In the example of FIG. 4, the attribute information includes at least one of a device name, a device type, an original plant, an ontology expression, and an operating condition. The device name and the device type may be selected from a predetermined device name list or a device type list. Note that, the original plant is information for identifying an existing plant for which actually measured data used for formation of each variation model has been measured. In addition, the ontology expression may be an ontology indicating a device included in each variation model, may be an ontology indicating a variation model, or may also be an ontology indicating an original plant. The ontology indicating a variation model may include a factor of variation that is simulated by the variation model and a parameter that varies, such as 'change in flow rate due to a deposited material', for example. As described above, an aspect of variation in characteristics of each device can change, according to an operating condition of a plant. The variation model storage unit 20 may be configured to store a variation model for each operating condition of a plant. However, the attribute information is not limited thereto. The attribute information may be information in which a partial variation model is associated with each device or a partial structure model. Further, in the example of FIG. 4, the variation model storage unit 20 stores the same type of attribute information for the respective variation models, but in another example, the variation model storage unit 20 may also store different types of attribute information for each variation model.

The model extraction unit 10 is configured to extract a variation model, based on the attribute information of each device included in the structure model. The model extraction unit 10 may be configured to extract a partial variation model having attribute information having the highest degree of similarity to the attribute information of the device. The model extraction unit 10 may be configured to calculate a degree of similarity between the attribute information by a predetermined algorithm.

Further, the model extraction unit 10 may be configured to preferentially select a partial variation model of the same original plant for one analysis target plant. When there is a plurality of candidates as a partial variation model of each device, the model extraction unit 10 may be configured to extract partial variation models for respective devices so that a number of partial variation models with the same original plant is the largest in the entire variation model. The model extraction unit 10 may be configured to preferentially extract a variation model with the same original plant, for a plurality of devices connected to each other. For example, a case is considered in which devices of a type D and a type E are connected. In the example of FIG. 4, for the device of the type D, a model D and a model E are candidates for a variation model. On the other hand, for the device of the type E, a model F is a candidate for a variation model. In this case, the model extraction unit 10 may select the model E with the same original plant as the model F, for the device of the type D.

Since the variation model storage unit 20 stores a plurality of variation models generated based on operations of a plurality of existing plants, various variation models can be stored in a form of a database. The analysis unit 40 can analyze the analysis target plant by combining the variation models generated from operation results of different existing plants. For this reason, it is possible to construct an entire variation model of the entire plant by appropriately combining partial variation models suitable for a structure of the analysis target plant. Therefore, it is easy to analyze various plants, in consideration of the variation models.

FIG. 5 is an example of information that is stored in the structure model storage unit 30. The structure model storage unit 30 stores a plurality of partial structure models (structure models A, B, . . . ). In addition, the structure model storage unit 30 stores one or more attribute information for each partial structure model. In the example of FIG. 5, the attribute information includes at least one of a device name, a device type, an original plant, and an ontology expression. Further, in the example of FIG. 5, the structure model storage unit 30 stores the same type of attribute information for the respective partial structure models, but in another example, the structure model storage unit 30 may also store different types of attribute information for each partial structure model. In addition, the structure model storage unit 30 may also store ontology expressions for the respective partial structure models.

In a case where the structure information does not include a structure model itself, the model extraction unit 10 may be configured to extract a structure model from the structure model storage unit 30, based on the structure information. The structure information may include information for specifying a structure model stored in the structure model storage unit 30. Similar to the variation model, the model extraction unit 10 may also be configured to extract a corresponding structure model, based on the attribute information included in the structure information. Each structure model may be a model generated in advance by a manufacturer of each device, a designer of the plant, or the like. Each structure model may also be a model generated at the time of designing an existing plant, or the like. In a case where the structure information includes a structure model itself, the structure model storage unit 30 may also be configured to newly register the structure model. In this case, it is preferred to store the attribute information included in the structure information in association with the structure model. The model extraction unit 10 may be configured to extract a structure model, based on the ontology expression corresponding to each structure model. In this case, the structure information may include the ontology expressions of the structure models. The model extraction unit 10 may also be configured to generate an entire structure model of the analysis target plant by extracting a plurality of partial structure models based on the ontology information and the like of the structure information and combining the plurality of partial structure models.

The model extraction unit 10 may be configured to construct an entire structure model by combining the extracted partial structure models. The partial variation model extracted by the model extraction unit 10 and the partial structure model may or may not have a one-to-one correspondence. The model extraction unit 10 may be configured to independently extract the structure model and the variation model, respectively, based on the structure information. In another example, the model extraction unit 10 may also be configured to extract a partial variation model corresponding to a device and the like included in an entire structure model after constructing the entire structure model of the analysis target plant. In this case, the model extraction unit 10 may be configured to extract the corresponding partial variation model, based on the attribute information of the partial structure model.

Figure 6:
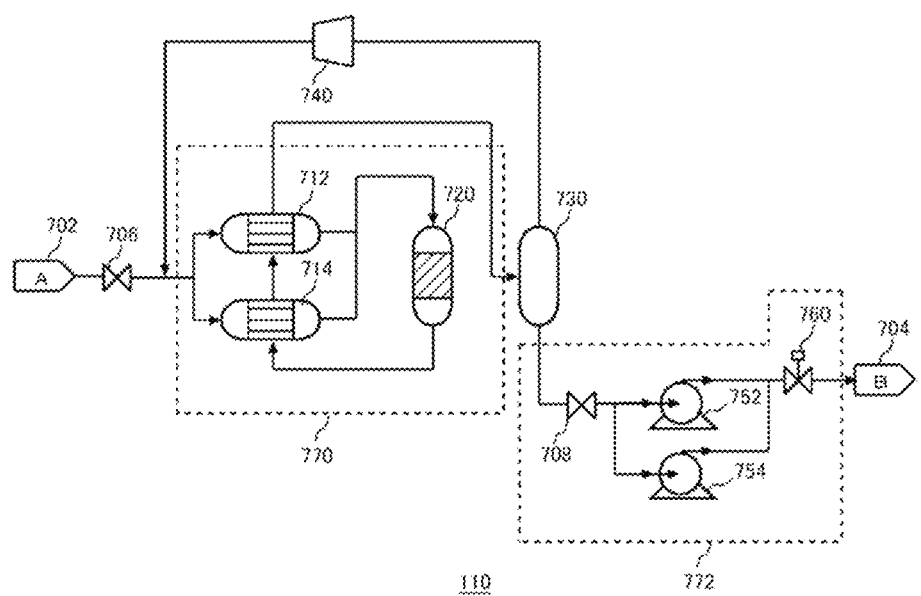
FIG. 6 shows another configuration example of the analysis target plant 110.

FIG. 6 shows another configuration example of the analysis target plant 110. The present example is different from the example of FIG. 2, in that the analysis target plant 110 has one or more blocks (a block 770 and a block 772). The other points are similar to the example of FIG. 2.

Each block includes a plurality of devices. The block is a conceptual range defined by a user of the analysis apparatus 100, a designer of the plant, the model extraction unit 10 or the like, and does not indicate a physical housing or the like. The block may include a plurality of devices configured to cooperate with each other to achieve a predetermined function. To each block, attribute information including an included device, a function of the block or an ontology expression may be allotted.

The model extraction unit 10 may be configured to acquire a structure model corresponding to the block 770 and the block 772. The structure model storage unit 30 may be configured to store a partial structure model in a block unit.

Figure 7:
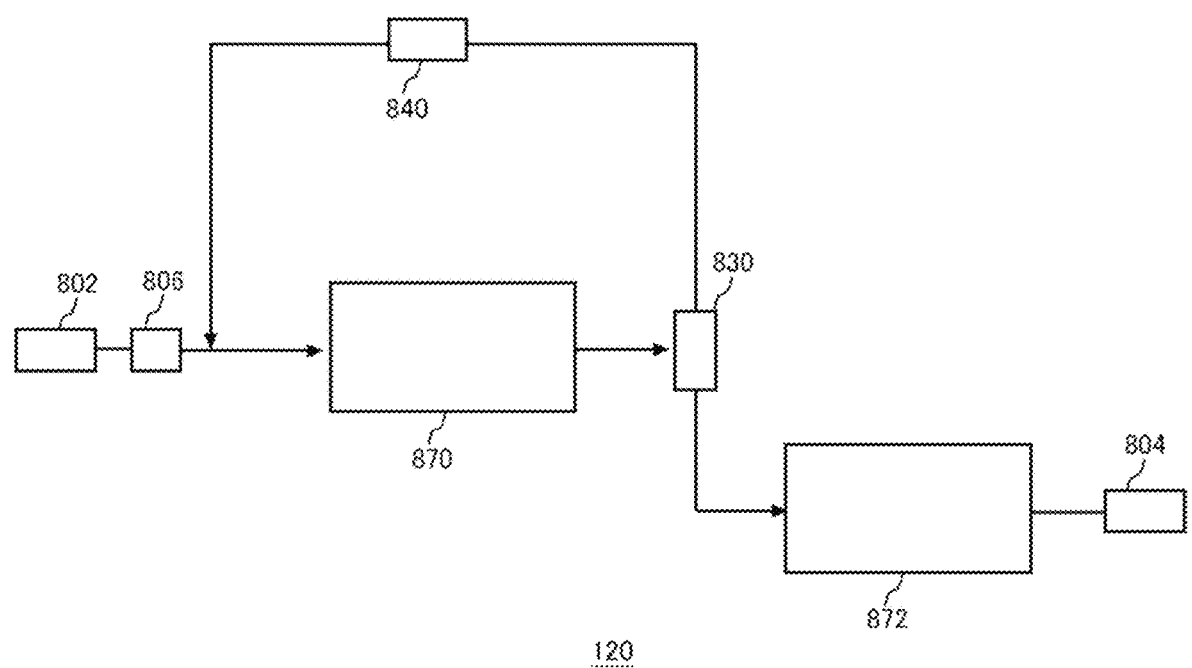
FIG. 7 shows another example of the information that is included in the entire variation model 120.

FIG. 7 shows another example of the information that is included in the entire variation model 120. The entire variation model 120 of the present example is different from the example of FIG. 3, in that it has partial variation models 870 and 872 in block units. The other points are similar to the example of FIG. 3. The partial variation model 870 is a variation model corresponding to the block 770, and the partial variation model 872 is a variation model corresponding to the block 772. That is, the partial variation models 870 and 872 are variation models in block units including one or more devices. The variation model storage unit 20 may be configured to store a variation model in a block unit. Similarly, the structure model storage unit 30 may be configured to store a structure model in a block unit.

The model extraction unit 10 may be configured to extract a variation model corresponding to a target block (for example, block 770 and block 772) included in the structure model of the analysis target plant 110 from the variation model storage unit 20. By extracting the variation model in a block unit, it is possible to extract a more appropriate variation model.

FIG. 8 is another example of the information that is stored in the variation model storage unit 20. The variation model storage unit 20 of the present example stores a variation model in a block unit. Similar to the example of FIG. 4, the variation model storage unit 20 may store the variation model for each device.

The variation model storage unit 20 may store a structure of a block and a function of a block, in addition to the attribute information in the example of FIG. 4, as the attribute information of the variation model in a block unit. The structure of a block may include configurations of devices included in the block, a connection relationship between the devices, and the like. The function of a block may be a type of a processing content for a to-be-processed object flowing in a plant, such as stirring, heating, and storage. In addition, the variation model storage unit 20 may store a variation model for each operating condition, for a block having a same structure. In the example of FIG. 8, the variation model storage unit 20 stores variation models A, B, and C corresponding to operating conditions A, B, and C, for blocks having a same structure (devices A, B, . . . ). For example, in the block 772, the degrees of deterioration of the pump 752 and the pump 754 may change due to a difference in balance between the opening degrees of the valve 708 and the valve 760. The variation model storage unit 20 may store a variation model corresponding to an operating condition of each device in a block.

The model extraction unit 10 is configured to extract a variation model corresponding to the target block, based on a degree of similarity between a structure of the target block (for example, block 770 and block 772) and a structure of each variation model. The degree of similarity of the structure may be calculated based on a degree of coincidence of constitutional devices. A predetermined coefficient may be set for each device. An algorithm where the degree of similarity of the structure is higher when a name or type of a device having a higher coefficient is matched may be set in the model extraction unit 10. In addition, the degree of similarity of the structure may also be calculated based on a degree of coincidence of a connection relationship between the constitutional devices. A predetermined coefficient may be set for each device. An algorithm where the degree of similarity of the structure is higher when a connection relationship between devices having the higher coefficients is matched may be set in the model extraction unit 10. This makes it easier to extract a variation model whose important device is matched with the target block. Further, the model extraction unit 10 may also be configured to extract a variation model, based on a degree of similarity between the ontology expression of the target block and the ontology expression of the variation model.

FIG. 9 is another example of the information that is stored in the structure model storage unit 30. The structure model storage unit 30 of the present example stores a structure model in a block unit. Similar to the example of FIG. 5, the structure model storage unit 30 may also store the structure model for each device.

The structure model storage unit 30 may store a structure of a block and a function of a block described in FIG. 8, in addition to the attribute information of the example of FIG. 5, as the attribute information of the variation model in a block unit. The model extraction unit 10 is configured to extract a structure model corresponding to the target block, based on a degree of similarity between a structure of the target block (for example, block 770 and block 772) and a structure of each structure model. A method of calculating the degree of similarity of the structure is similar to the example of FIG. 8. Further, the model extraction unit 10 may also be configured to extract a structure model, based on a degree of similarity between the ontology expression of the target block and the ontology expression of the structure model.

Figure 10:
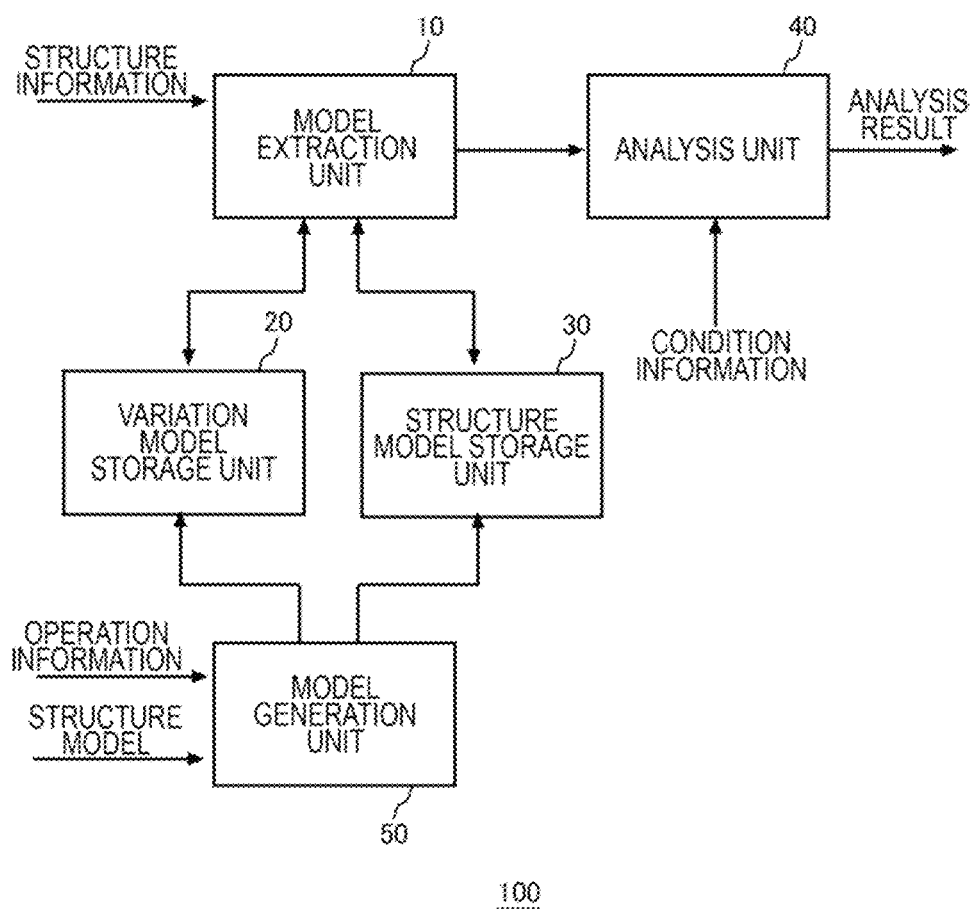
FIG. 10 shows another configuration example of the analysis apparatus 100.

FIG. 10 shows another configuration example of the analysis apparatus 100. The analysis apparatus 100 of the present example further comprises a model generation unit 50, in addition to the configuration of the analysis apparatus 100 described with reference to FIGS. 1 to 9. The other configurations are similar to the analysis apparatus 100 described with reference to FIGS. 1 to 9.

The model generation unit 50 is configured to generate a variation model, based on operation information of each device in an existing plant. The operation information may be information obtained by measuring an actual operation result of each device. The model generation unit 50 may be given with a structure model of the existing plant in association with the operation information.

The model generation unit 50 may be configured to collect operation information of a plurality of existing plants and to generate a plurality of variation models. The operation information may include data indicating variation over time in characteristics of each device. For example, the operation information includes control data of each device and a history of an operation result. The operation information may include information for generating attribute information of a variation model, such as a type of an existing plant, a temperature and a humidity. In addition, the model generation unit 50 may be configured to generate attribute information of a variation model from operation information and structure models of a plurality of existing plants. The model generation unit 50 may be configured to store the generated variation model and the input structure model in the variation model storage unit 20 and the structure model storage unit 30 in association with each other.

Further, when a device or the like is replaced in an existing plant, the model generation unit 50 may be configured to generate different variation models before and after the replacement of the device. That is, when the device or the like is replaced, a variation model is generated from the operation information of the existing plant before the replacement of the device, and a variation model is also generated from the operation information of the existing plant after the replacement of the device.

Figure 11:
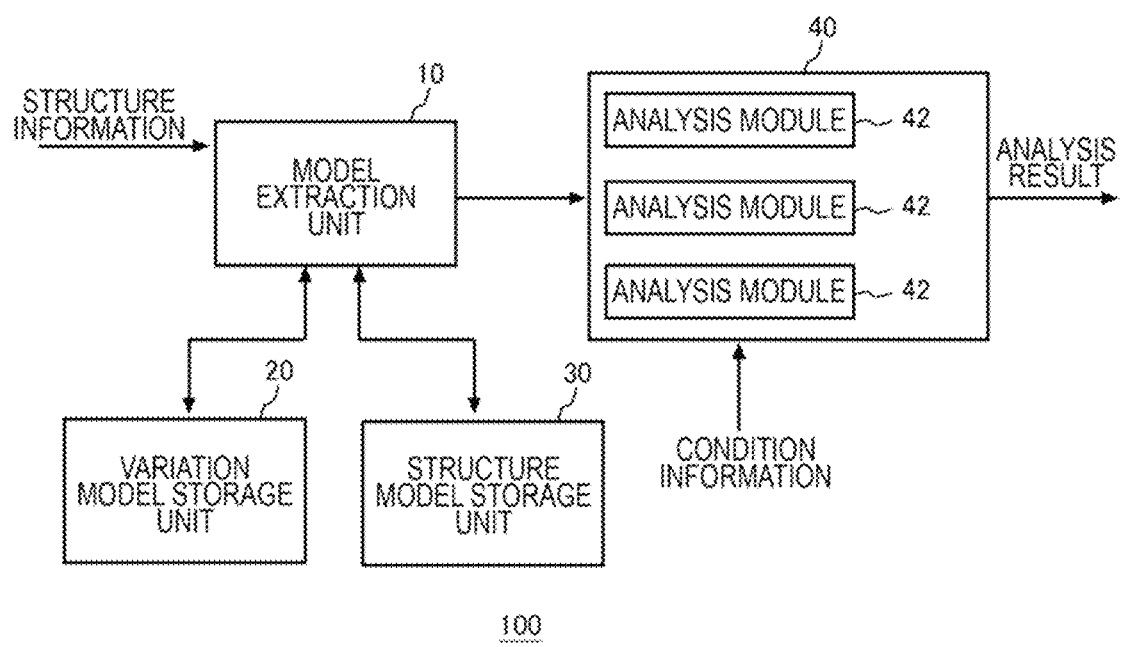
FIG. 11 shows another configuration example of the analysis apparatus 100.

FIG. 11 shows another configuration example of the analysis apparatus 100. In the present example, the analysis unit 40 has a plurality of analysis modules 42. The other structures are similar to the analysis apparatus 100 described with reference to FIGS. 1 to 10.

Each analysis module 42 is configured to perform different analysis for the analysis target plant. Each analysis module 42 may be a simulator configured to simulate an operation of the analysis target plant by using the variation model and the structure model and the input condition information. The different analysis indicates that at least a part of the analysis processing is different. The input parameters and output parameters with respect to the respective analysis modules 42 may be the same or different.

The analysis unit 40 is configured to select the analysis module 42 according to a type of the variation model and to analyze the analysis target plant. The type of the variation model may be a type of a parameter that changes over time. For example, a variation model that simulates a gradual decrease in piping flow rate as a result of gradual clogging of a piping due to foreign matters, and a variation model that simulates a gradual decrease in pump flow rate due to gradual accumulation of foreign matters in a pump may perform analysis by using the analysis modules 42 different from each other. Each analysis module 42 may be configured to perform processing optimized for a particular type of a variation model. This can improve the accuracy and speed of the analysis.

Figure 12:
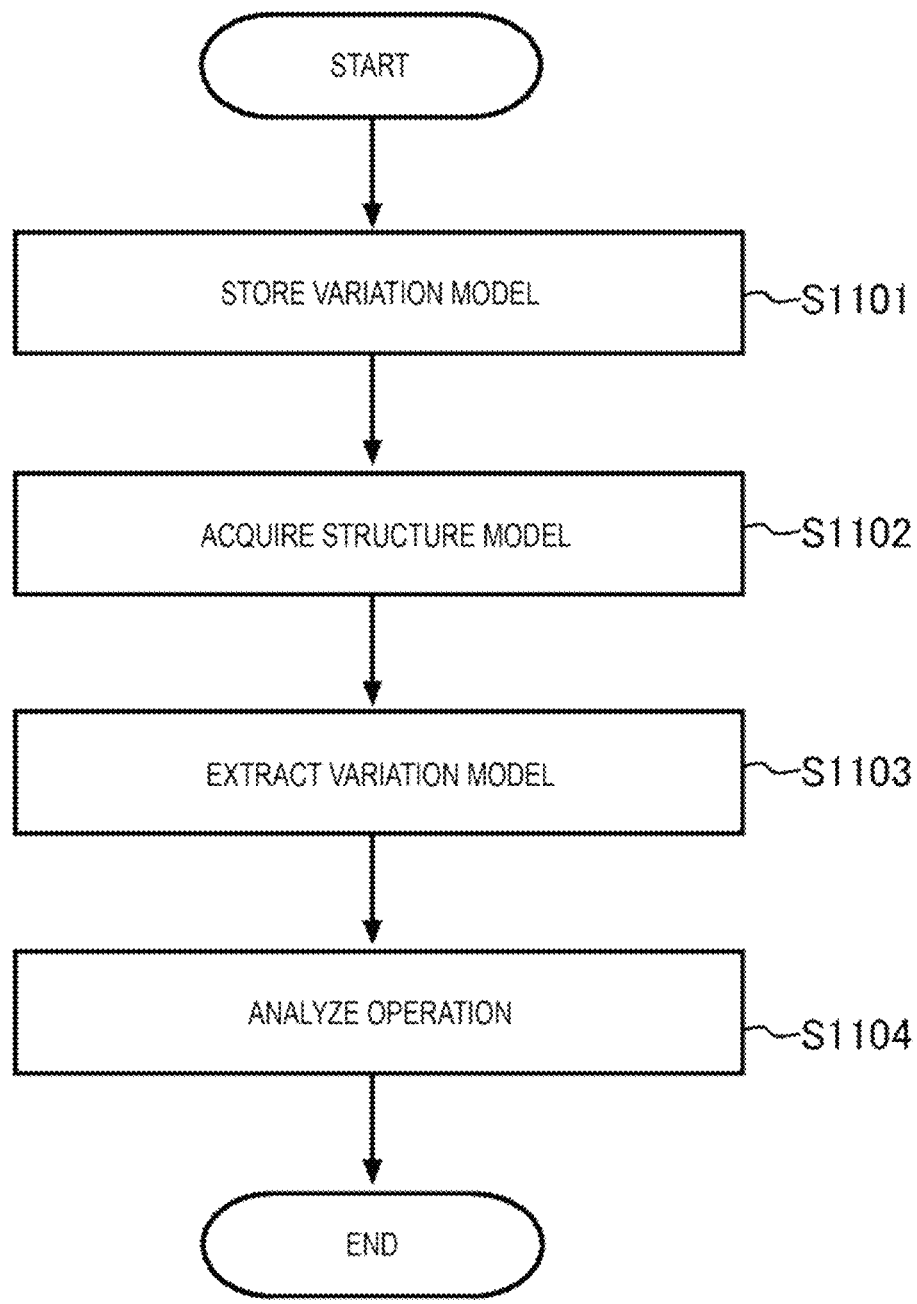
FIG. 12 shows an example of an analysis method of an analysis target plant.

FIG. 12 shows an example of an analysis method of an analysis target plant. Each processing in the analysis method is similar to the operations of the analysis apparatus 100 described with reference to FIGS. 1 to 11.

First, a plurality of variation models indicating variation in characteristics of a plant corresponding to an operating condition of the plant is stored in the variation model storage unit 20 (step S1101). Thereby, a database of variation models is constructed in advance.

Next, the model extraction unit 10 acquires a structure model of the analysis target plant (S1102). The model extraction unit 10 may acquire structure information including a structure model, and may also extract a structure model from the structure model storage unit 30, based on the structure information.

In addition, the model extraction unit 10 extracts a variation model from the variation model storage unit 20 (S1103). The model extraction unit 10 extracts a variation model corresponding to the structure model. Next, the analysis unit 40 analyzes the analysis target plant, based on the structure model and the variation model (S1104). In the analysis method, in addition to the processing shown in FIG. 12, the processing described in FIGS. 1 to 11 may be performed.

Figure 13:
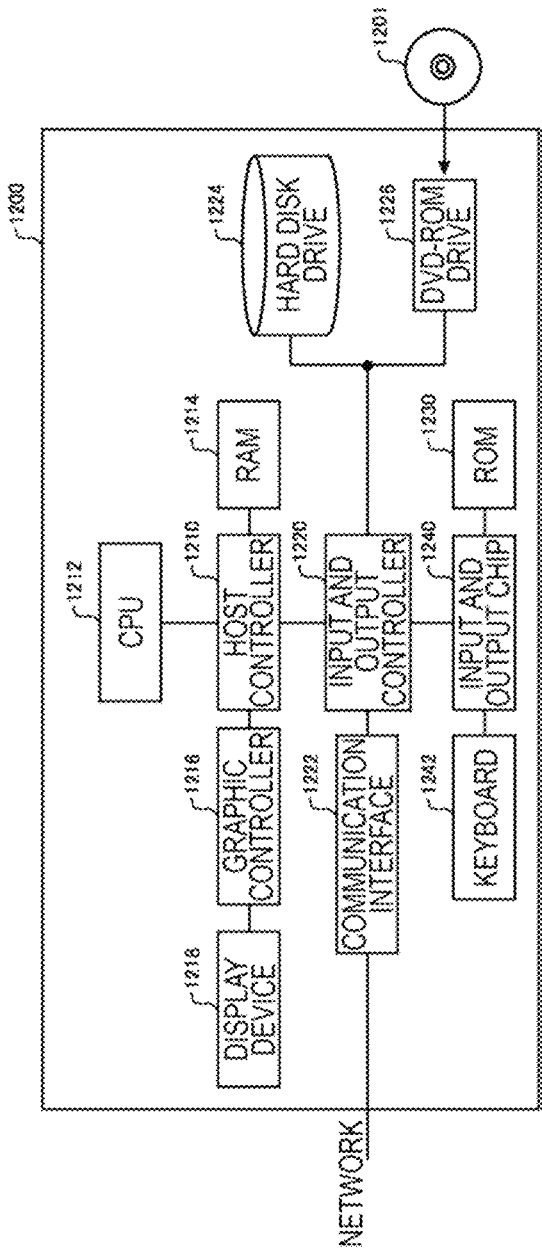
FIG. 13 shows a configuration example of a computer 1200 in which a plurality of aspects of the present invention may be entirely or partially embodied.

FIG. 13 shows a configuration example of a computer 1200 in which a plurality of aspects of the present invention may be entirely or partially embodied. A program that is installed in the computer 1200 can cause the computer 1200 to function as or execute operations associated with the apparatus of the embodiment of the present invention or one or more sections of the apparatus, and/or cause the computer 1200 to execute the process of the embodiment of the present invention or steps thereof. Such program may be executed by a CPU 1212 so as to cause the computer 1200 to execute certain operations associated with some or all of the blocks of flowcharts and block diagrams described herein. The process of the embodiment of the present invention or steps thereof may also be executed on a cloud.

The computer 1200 according to the present embodiment includes the CPU 1212, a RAM 1214, a graphic controller 1216 and a display device 1218, which are mutually connected by a host controller 1210. The computer 1200 also includes input and output units such as a communication interface 1222, a hard disk drive 1224, a DVD-ROM drive 1226 and an IC card drive, which are connected to the host controller 1210 via an input and output controller 1220. The computer also includes legacy input and output units such as a ROM 1230 and a keyboard 1242, which are connected to the input and output controller 1220 via an input and output chip 1240.

The CPU 1212 is configured to operate according to programs stored in the ROM 1230 and the RAM 1214, thereby controlling each unit. The graphic controller 1216 is configured to acquire image data generated by the CPU 1212 on a frame buffer or the like provided in the RAM 1214 or in the graphic controller 1216 itself, and to cause the image data to be displayed on the display device 1218.

The communication interface 1222 is configured to communicate with other electronic devices via a network. The hard disk drive 1224 is configured to store programs and data that are used by the CPU 1212 within the computer 1200. The DVD-ROM drive 1226 is configured to read programs or data from the DVD-ROM 1201, and to provide the hard disk drive 1224 with the programs or data via the RAM 1214. The IC card drive is configured to read programs and data from an IC card, and/or to write programs and data into the IC card.

The ROM 1230 is configured to store a boot program or the like that is executed by the computer 1200 at the time of activation, and/or a program depending on the hardware of the computer 1200. The input and output chip 1240 may also be configured to connect various input and output units to the input and output controller 1220 via a parallel port, a serial port, a keyboard port, a mouse port and the like.

A program is provided by a computer-readable storage medium such as the DVD-ROM 1201 or the IC card. The program is read from the computer-readable storage medium, is installed into the hard disk drive 1224, the RAM 1214 or the ROM 1230, which are also examples of the computer-readable storage medium, and is executed by the CPU 1212. Information processing described in these programs is read into the computer 1200, resulting in cooperation between the programs and the various types of hardware resources described above. An apparatus or a method may be configured by realizing an operation or processing of information according to a use of the computer 1200.

For example, when communication is performed between the computer 1200 and an external device, the CPU 1212 may be configured to execute a communication program loaded onto the RAM 1214 to instruct the communication interface 1222 for communication processing, based on the processing described in the communication program. The communication interface 1222 is configured, under control of the CPU 1212, to read transmission data stored on a transmission buffer area provided in a recording medium such as the RAM 1214, the hard disk drive 1224, the DVD-ROM 1201 or the IC card, and to transmit the read transmission data to a network or to write reception data received from the network to a reception buffer area or the like provided on the recording medium.

In addition, the CPU 1212 may be configured to cause all or a necessary portion of a file or a database, which has been stored in an external recording medium such as the hard disk drive 1224, the DVD-ROM drive 1226 (DVD-ROM 1201) and the IC card, to be read into the RAM 1214, thereby executing various types of processing on the data on the RAM 1214. Next, the CPU 1212 may be configured to write the processed data back to the external recording medium.

Various types of information, such as various types of programs, data, tables, and databases, may be stored in the recording medium for information processing. The CPU 1212 may be configured to execute, on the data read from the RAM 1214, various types of processing including various types of operations, processing of information, conditional judgment, conditional branching, unconditional branching, search and replacement of information and the like described in the present disclosure and specified by instruction sequences of the programs, and to write a result back to the RAM 1214. The CPU 1212 may also be configured to search for information in a file, a database, etc., in the recording medium. For example, when a plurality of entries, each having an attribute value of a first attribute associated with an attribute value of a second attribute, is stored in the recording medium, the CPU 1212 may be configured to search for an entry having a designated attribute value of the first attribute that matches a condition from the plurality of entries, and to read the attribute value of the second attribute stored in the entry, thereby acquiring the attribute value of the second attribute associated with the first attribute that satisfies a predetermined condition.

The programs or software modules described above may be stored in the computer-readable storage medium on the computer 1200 or near the computer 1200. In addition, a recording medium such as a hard disk or a RAM provided in a server system connected to a dedicated communication network or the Internet can be used as a computer-readable storage medium, thereby providing the programs to the computer 1200 via the network.

While the present invention has been described using the embodiments, the technical scope of the present invention is not limited to the above-described embodiments. It is apparent to persons skilled in the art that various alterations and improvements can be added to the above-described embodiments. It is also apparent from the scope of the claims that the embodiments added with such alterations or improvements can be included in the technical scope of the present invention.

The operations, procedures, steps, stages and the like of each process performed by an apparatus, system, program, and method shown in the claims, embodiments, or diagrams can be performed in any order as long as the order is not indicated by 'prior to,' 'before,' or the like and as long as the output from a previous process is not used in a later process. Even if the process flow is described using phrases such as 'first' or 'next' in the claims, embodiments, or diagrams, it does not necessarily mean that the process must be performed in this order.

EXPLANATION OF REFERENCES

10: model extraction unit, 20: variation model storage unit, 30: structure model storage unit, 40: analysis unit, 42: analysis module, 50: model generation unit, 100: analysis apparatus, 702: input unit, 704: output unit, 706: valve, 712: first heat exchanger, 714: second heat exchanger, 720: reactor, 730: tank, 740: compressor, 708: valve, 752: first pump, 754: second pump, 760: valve, 770: block, 772: block, 802 to 860: partial variation model, 870: partial variation model, 872: partial variation model, 1200: computer, 1201: DVD-ROM, 1210: host controller, 1212: CPU, 1214: RAM, 1216: graphic controller, 1218: display device, 1220: input and output controller, 1222: communication interface, 1224: hard disk drive, 1226: DVD-ROM drive, 1230: ROM, 1240: input and output chip, 1242 keyboard

What is claimed is:

1. An analysis apparatus comprising at least one processor, wherein:
    the analysis apparatus comprises a variation model storage unit that stores a plurality of variation models indicating variation in characteristics of a plant corresponding to an operating condition of the plant;
    the at least one processor acquires structure information indicating a structure model of an analysis target plant and extracts a variation model from the plurality of variation models corresponding to the structure model;
    the at least one processor analyzes the analysis target plant, based on the structure model of the analysis target plant and the variation model extracted by the at least one processor; and
    the at least one processor outputs a simulation model that simulates operation of the analysis target plant by combining the structure model and the variation model which are used to simulate influence of at least one of dirt or deposited material on at least one of piping or equipment of the analysis target plant.

2. The analysis apparatus according to claim 1, wherein the variation model storage unit stores the plurality of variation models generated from variations over time in characteristics of a device of the plant.

3. The analysis apparatus according to claim 1, further comprising a structure model storage unit that stores a plurality of the structure models of the plant, wherein
    the at least one processor analyzes the analysis target plant by using a structure model from the plurality of structure models selected from the structure model storage unit according to the structure information.

4. The analysis apparatus according to claim 2, further comprising a structure model storage unit that stores a plurality of the structure models of the plant, wherein
the at least one processor analyzes the analysis target plant by using a structure model from the plurality of structure models selected from the structure model storage unit according to the structure information.

5. The analysis apparatus according to claim 1, wherein:
the variation model storage unit stores the plurality of variation models in a block unit including one or more devices in the plant, and
the at least one processor extracts the variation model, which corresponds to a target block included in the structure model of the analysis target plant, from the variation model storage unit.

6. The analysis apparatus according to claim 2, wherein:
the variation model storage unit stores the plurality of variation models in a block unit including one or more devices in the plant, and
the at least one processor extracts the variation model, which corresponds to a target block included in the structure model of the analysis target plant, from the variation model storage unit.

7. The analysis apparatus according to claim 5, wherein:
the variation model storage unit stores the plurality of variation models and a structure of the block in association with each other, and
the at least one processor extracts the variation model corresponding to the target block, based on a degree of similarity between a structure of the target block and a structure of the block corresponding to the variation model.

8. The analysis apparatus according to claim 6, wherein:
the variation model storage unit stores the plurality of variation models and a structure of the block in association with each other, and
the at least one processor extracts the variation model corresponding to the target block, based on a degree of similarity between a structure of the target block and a structure of the block corresponding to the variation model.

9. The analysis apparatus according to claim 5, wherein:
the variation model storage unit stores the plurality of variation models generated from actual operation results of a plurality of existing plants, and
the at least one processor analyzes the analysis target plant by combining the plurality of variation models of different existing plants.

10. The analysis apparatus according to claim 6, wherein:
the variation model storage unit stores the plurality of variation models generated from actual operation results of a plurality of existing plants, and
the at least one processor analyzes the analysis target plant by combining the plurality of variation models of different existing plants.

11. The analysis apparatus according to claim 5, wherein the at least one processor comprises a plurality of analysis modules that perform different analyses on the analysis target plant and analyze the analysis target plant by selecting an analysis module of the plurality of analysis modules corresponding to the variation model.

12. The analysis apparatus according to claim 6, wherein the at least one processor comprises a plurality of analysis modules that perform different analyses on the analysis target plant and analyze the analysis target plant by selecting an analysis module of the plurality of analysis modules corresponding to the variation model.

13. The analysis apparatus according to claim 7, wherein the at least one processor comprises a plurality of analysis modules that perform different analyses on the analysis target plant and analyze the analysis target plant by selecting an analysis module of the plurality of analysis modules corresponding to the variation model.

14. The analysis apparatus according to claim 8, wherein the at least one processor comprises a plurality of analysis modules that perform different analyses on the analysis target plant and analyze the analysis target plant by selecting an analysis module of the plurality of analysis modules corresponding to the variation model.

15. The analysis apparatus according to claim 9, wherein the at least one processor comprises a plurality of analysis modules that perform different analyses on the analysis target plant and analyze the analysis target plant by selecting an analysis module of the plurality of analysis modules corresponding to the variation model.

16. The analysis apparatus according to claim 10, wherein the at least one processor comprises a plurality of analysis modules that perform different analyses on the analysis target plant and analyze the analysis target plant by selecting an analysis module of the plurality of analysis modules corresponding to the variation model.

17. The analysis apparatus according to claim 1, wherein the at least one processor collects a structure model and operation information of each device of an existing plant and generates the variation model.

18. The analysis apparatus according to claim 2, wherein the at least one processor collects a structure model and operation information of each device of an existing plant and generates the variation model.

19. An analysis method implemented by at least one processor comprising:
storing a plurality of variation models indicating variation in characteristics of a plant corresponding to an operating condition of the plant using the at least one processor;
acquiring structure information indicating a structure model of an analysis target plant and extracting a variation model from the plurality of variation models corresponding to the structure model using the at least one processor; and
analyzing the analysis target plant, based on the structure model of the analysis target plant and the variation model using the at least one processor; and
outputting a simulation model that simulates operation of the analysis target plant, using the at least one processor, by combining the structure model and the variation model to simulate influence of at least one of dirt or deposited material on at least one of piping or equipment of the analysis target plant.

20. A non-transitory computer-readable medium having a program recorded thereon that, when executed by a computer, causes the computer to execute:
storing a plurality of variation models indicating variation in characteristics of a plant corresponding to an operating condition of the plant using the computer;
acquiring structure information indicating a structure model of an analysis target plant and extracting a variation model from the plurality of variation models corresponding to the structure model using the computer;
analyzing the analysis target plant, based on the structure model of the analysis target plant and the variation model using the computer; and outputting a simulation model that simulates operation of the analysis target plant, using the computer, by combining the structure model and the variation model which are used to simulate influence of at least one of dirt or deposited material on at least one of piping or equipment of the analysis target plant.

* * * * *